United States Patent
Kloft et al.

(10) Patent No.: US 10,532,527 B2
(45) Date of Patent: Jan. 14, 2020

(54) METHOD FOR THE PRODUCTION OF A BLADDER ACCUMULATOR AND BLADDER ACCUMULATOR PRODUCED ACCORDING TO SAID METHOD

(71) Applicant: HYDAC TECHNOLOGY GMBH, Sulzbach/Saar (DE)

(72) Inventors: Peter Kloft, Ransbach-Baumbach (DE); Herbert Baltes, Losheim (DE)

(73) Assignee: HYDAC TECHNOLOGY GMBH, Sulzbach/Saar (DE)

( * ) Notice: Subject to any disclaimer, the term of this patent is extended or adjusted under 35 U.S.C. 154(b) by 31 days.

(21) Appl. No.: 15/580,319

(22) PCT Filed: Apr. 25, 2016

(86) PCT No.: PCT/EP2016/000656
§ 371 (c)(1),
(2) Date: Dec. 7, 2017

(87) PCT Pub. No.: WO2016/198138
PCT Pub. Date: Dec. 15, 2016

(65) Prior Publication Data
US 2018/0162081 A1 Jun. 14, 2018

(30) Foreign Application Priority Data
Jun. 9, 2015 (DE) .......... 10 2015 007 684

(51) Int. Cl.
*B29C 49/20* (2006.01)
*B29D 22/02* (2006.01)
*F15B 1/16* (2006.01)
*F17C 1/16* (2006.01)
(Continued)

(52) U.S. Cl.
CPC ............ *B29D 22/02* (2013.01); *B29C 49/041* (2013.01); *F15B 1/165* (2013.01); *F17C 1/16* (2013.01);
(Continued)

(58) Field of Classification Search
CPC ............ B29C 49/20; B29C 2049/2047; B29C 2049/2052
See application file for complete search history.

(56) References Cited

U.S. PATENT DOCUMENTS 5,499,739 A * 3/1996 Greist, III ............ B29C 53/602
138/30
6,171,423 B1 1/2001 Murphy et al.
(Continued)

FOREIGN PATENT DOCUMENTS

DE 10 2006 004 120 7/2007
DE 10 2010 033 623 2/2012
(Continued)

OTHER PUBLICATIONS

International Search Report dated Jul. 28, 2016 in International PCT Application No. PCT/EP2016/000656.

*Primary Examiner* — Jeffry H Aftergut
(74) *Attorney, Agent, or Firm* — Wenderoth, Lind & Ponack, L.L.P.

(57) ABSTRACT

A method for the production of a bladder accumulator (10) that separates two media chambers (16, 18) from one another in a storage housing (12) by a bladder body (14). The following production steps include extruding a plastic tube over the bladder body (14), shaping the plastic tube with the integrated bladder body (14) in a molding tool that corresponds to a predeterminable plastic core container (20), and winding at least one plastic fiber from the outside on the plastic core container (20) for the purpose of creating the storage housing (12).

16 Claims, 1 Drawing Sheet

(51) Int. Cl.
*B29C 49/04* (2006.01)
*B29L 22/02* (2006.01)
*B29L 31/00* (2006.01)

(52) U.S. Cl.
CPC . *B29C 2049/2047* (2013.01); *B29L 2022/025* (2013.01); *B29L 2031/7156* (2013.01); *F15B 2201/3152* (2013.01); *F15B 2201/4053* (2013.01); *F15B 2201/4155* (2013.01); *F15B 2201/615* (2013.01); *F17C 2201/018* (2013.01); *F17C 2201/0109* (2013.01); *F17C 2201/0147* (2013.01); *F17C 2203/0604* (2013.01); *F17C 2203/0663* (2013.01); *F17C 2205/0305* (2013.01); *F17C 2205/0394* (2013.01); *F17C 2250/043* (2013.01); *F17C 2250/0447* (2013.01)

(56) References Cited

U.S. PATENT DOCUMENTS

| | | |
|---|---|---|
| 2009/0095366 A1 | 4/2009 | Gray, Jr. |
| 2009/0107570 A1* | 4/2009 | Weber ...................... F17C 1/16 138/30 |
| 2014/0190965 A1 | 7/2014 | Kloft et al. |
| 2017/0184133 A1* | 6/2017 | Boucaux ................. F15B 1/106 |

FOREIGN PATENT DOCUMENTS

| | | |
|---|---|---|
| DE | 10 2011 111 098 | 5/2013 |
| EP | 1 112 171 | 7/2001 |
| EP | 2 030 769 | 3/2009 |
| WO | 2015/162355 | 10/2015 |

\* cited by examiner

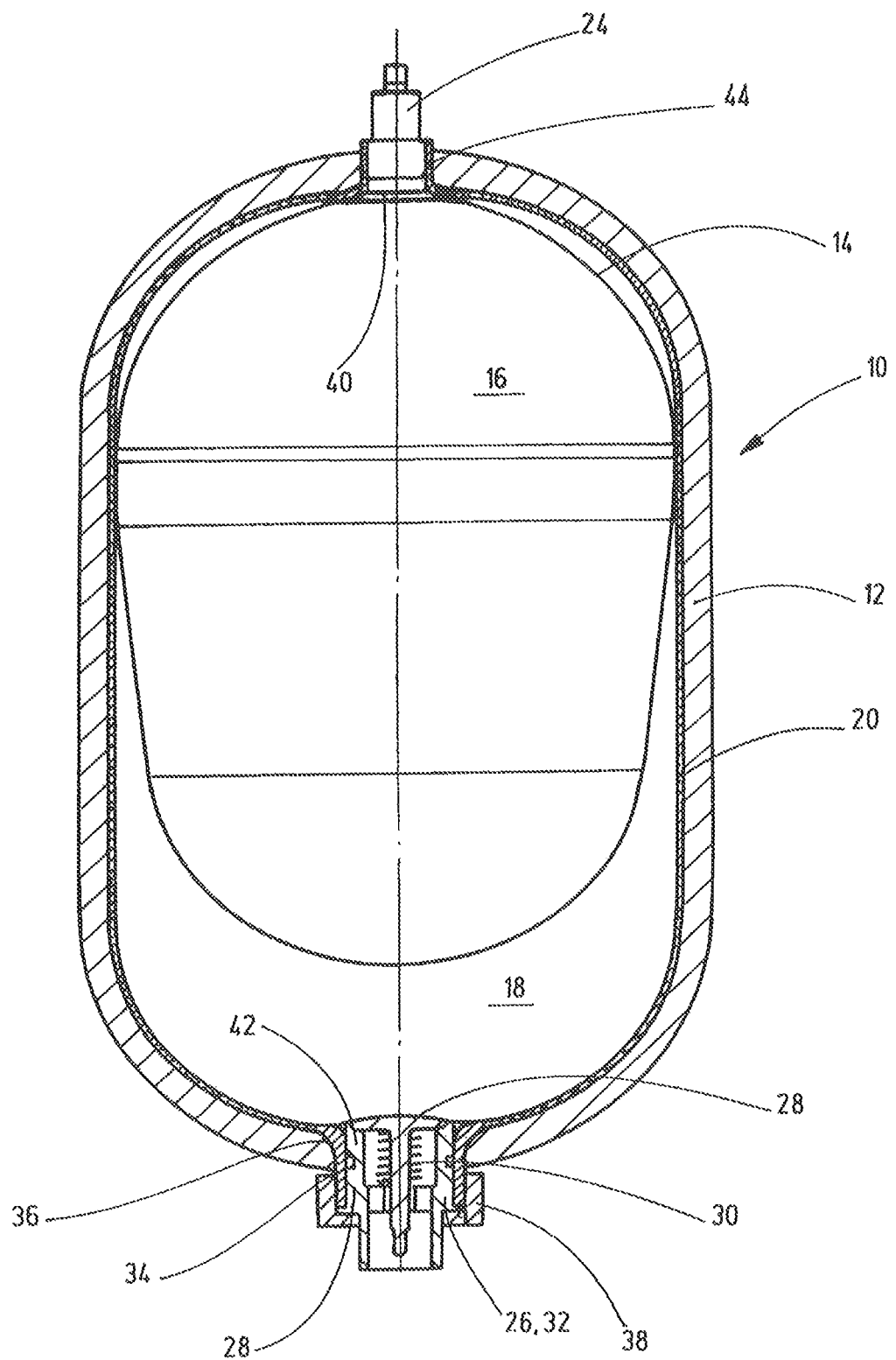

METHOD FOR THE PRODUCTION OF A BLADDER ACCUMULATOR AND BLADDER ACCUMULATOR PRODUCED ACCORDING TO SAID METHOD

FIELD OF THE INVENTION

The invention concerns a method for the manufacture of a bladder accumulator, which separates two media chambers from each other in an accumulator housing by a bladder body. The invention concerns, moreover, a bladder accumulator manufactured according to the method.

BACKGROUND OF THE INVENTION

DE 10 2006 004 120 A1 discloses a hydraulic accumulator, in particular in form of a bladder accumulator, for the purpose of accepting at least one fluid medium within a pressure vessel comprising a first synthetic sheath as well as a second synthetic sheath that at least partially surrounds the first synthetic sheath. The first synthetic sheath is provided at least at its one end with a collar portion, which comprises an opening for a valve that is provided for controlling the media supply and discharge. The collar portion and the second synthetic sheath are supported on an in-between-located outer support ring, which tapers in a wedge-like manner in the direction of a slot-shaped opening between the two sheaths.

In the known solution, the slot-shaped opening between the sheaths is extended to a point where the sheaths are coaxially in contact with each other. In the opening, a poppet valve is disposed for controlling the media supply and discharge. A sealed accumulator arrangement is provided that can be realised at relatively low manufacturing costs. Because the support extends via the wedge-shaped tapered outer support ring into the outer circumference section of both sheaths, any relative movements that may occur between the synthetic sheaths are absorbed by the outer support ring. Damaging delamination processes are directly avoided in this manner between the sensitive synthetic materials.

The technical terminology for the first synthetic sheath is also "synthetic core container" or "liner". It is preferably made from polyamide by a blow moulding process or through rotational moulding. At the outer circumference the first synthetic core container or liner is reinforced through externally wound fibre windings, which constitutes the second synthetic sheath. To protect the fibre windings, the individual fibres can be embedded in a basic matrix of duromers, for example epoxy resins, phenolic resins or in thermoplastic resins, for example in form of PA6, PA12, PP etc. In order to place the poppet valve, i.e. the valve for liquids, on the one side of the accumulator housing, as well as the gas supply valve on the other opposite side of the accumulator housing, relatively large openings are required in the two-sheath accumulator housing, into which openings the respective collar portions must be placed in order to secure the respective valve at its housing opening side.

DE 10 2011 111 098 A1 discloses a pressure vessel, which is preferably used for bladder accumulators, comprising a multi-part container body that includes a tube-like centre section providing at least on one of its two ends an end section. A cover, which forms at least in part the respective end section, overlaps the centre section at the edge at least in the section of its respective end and forms a solid connection.

The known solution proposes to form the tube-shaped centre section as well as the respective cap from a fibre-reinforced composite material and/or from a fibre laminate, preferably from a glass fibre reinforced plastic (GRP). Standard GRP pipes can be used for the centre section. The caps for closing off said centre section are preferably made by a manual lamination process and may have comparable synthetic materials.

At the cap end of the accumulator housing, which will later accommodate the valve for the liquid, a relatively large opening is provided. That opening permits the accumulator bladder as the bladder body to be drawn, together with the gas filling valve that is attached through vulcanising, into the inside of the accumulator housing so that the gas valve is located on the opposite side of the housing in the respective opening in the accumulator housing that has a comparatively smaller diameter. With regard to the different sizes of the valve openings in the accumulator housing, the subsequently applied windings are different by necessity. Each individual winding will have a different formation when subsequently combined, in particular with regard to its wall diameter, so that, although the composite fibre layers can be simply wound, when forces are applied weak points become apparent, in particular when it is desired to achieve high strength values in axial direction of the accumulator housing.

SUMMARY OF THE INVENTION

Based upon the prior art, an object of the invention is to provide, in contrast, an improved method for the manufacture of a bladder accumulator that can be made cost-effectively and exhibits high strength values in the accumulator housing.

This object basically is met by a method according to the invention for the manufacture of a bladder accumulator that is characterized by the following production steps:
  extrusion of a plastic tube over a bladder body;
  moulding of the plastic tube with integrated bladder body in a moulding tool that corresponds to a predeterminable synthetic core container, and
  winding at least one plastic fibre from the outside onto the synthetic core container for the purpose of creating the accumulator housing.

The solution according to the invention is based upon the idea of integrating the bladder body already during the moulding process of the synthetic core container or liner into that liner. To this end the plastic tube is extruded, preferably using the blow moulding process, over the bladder body. A blow mould, which usually has a moulding tool is adapted to the shape of the synthetic core container, is closed with multiple parts, preferably two halves, of a mould.

Since the bladder body is now already integrated into the synthetic core container, which to that extent constitutes part of the overall accumulator housing of the bladder accumulator, the separating bladder or the bladder body respectively together with any gas filling valve bonded through vulcanising is no longer required to be pulled through fluid-passing openings to create the bladder accumulator. To a large extent the size of the supply or media openings can then be independently chosen. Insofar as the free access openings in the accumulator housing can be made relatively small, there is a large amount of sheath material of the synthetic core container available, which is preferably wound as evenly as possible so that high strength values are achievable with respect to the kind of windings that are applied. This method has no equivalent in the prior art, and causes the production process, and thus, the resulting bladder accumulators to be cost-effective.

In a preferred embodiment of the method according to the invention provision is made that the bladder body, which is preferably made from an elastomeric material, is provided with an internal vacuum prior to the extrusion of the plastic tube. Due to the vacuum inside the bladder body, the elastically yielding material thereof is able to shrink together and make the bladder body slimmer. The tube made of soft plastic material, coming from the extruder nozzle and surrounding the bladder body, is then able to pass by the bladder body, free of obstruction and with suitable clearance, until the bladder body is fully enveloped inside the plastic tube. In this instance, the gas inlet valve as one of the media valves is already affixed to the bladder accumulator through vulcanising. The combination of plastic tube and integrated bladder body with valve is subsequently inserted into a suitable blow moulding tool with its mould halves and through closing of the mould halves, that is, through closing of the moulding tool, the synthetic core container of the bladder accumulator housing is completed, which contains as semi-finished product the bladder body, which is affixed to the synthetic core container via its gas valve that is attached through vulcanising.

In the instance that a valve for liquids is preferably installed into the moulding tool on the side opposite to the gas filling valve, and where the plastic tube is formed into the synthetic core container and the valve for liquids is simultaneously formed into the free end of the tube, the synthetic core container with valves at both ends together with the inserted bladder body can be produced particularly cost-effectively and virtually in a single production step.

Wound subsequently onto the synthetic core container from the outside, and leaving the valve attachment locations including valve components free, is at least one synthetic fibre for the purpose of producing the finished accumulator housing. The preferably used synthetic fibres are carbon fibres. To protect the carbon fibre windings, they may be embedded in a suitable synthetic resin.

Since the solution according to the invention no longer requires the accumulator bladder, or the bladder body respectively, with its gas filling valve attached through vulcanising to be inserted through the opening in the housing for the valve for liquids, which valve for liquids usually comes in form of a poppet valve, requiring a relatively large opening cross-section at this location in the accumulator housing, the opening or insertion cross-sections for the accumulator housing valves can be made relatively small even at the liquid end of the respective accumulator. In an average accumulator the openings may, for example, be in the vicinity of 50 to 60 mm, which leaves a large amount of adjoining sheath surface of the synthetic core container available, providing the opportunity for applying synthetic fibre windings, such as carbon fibre windings.

When applying such windings on a synthetic core container or liner, the placement of the individual fibre bundles or fibre strands, technically called "roving", is made according to the mathematical condition by Clairaut. This mathematical condition provides that the smallest winding angle results from the ratio of maximum diameter and the diameter at the turning point of the respective roving at which its direction changes. If this condition is not met, the respective roving slips off the predeterminable synthetic core container, or it leads to unnecessary bunching up of the fibre material in this section, which roving is then not able to contribute anything to the strength increase.

The "geodesic placements" that deviate to a small extent in practical application from this demand are, however, not detrimental due to the static friction of the individual rovings placed on top of each other. The larger the opening at the respective turning point, formed by the openings for accepting the valves provided in the accumulator housing, the steeper is the winding angle, which leads essentially to a thicker layer structure to achieve the required axial strength for the accumulator housing. Reducing the valve insertion opening in the wound accumulator housing according to the invention, permits the required axial strength in this section to be easily reached with a much reduced layer structure. The lower number of fibre layers (rovings) on top of each other, which layers are preferably embedded in surrounding resin, reduces the danger of undesired delamination in this section. Since carbon fibre material is quite expensive, as are other synthetic fibres, significant reductions in the production costs for the container through the thinner layer structure is now possible, while retaining the same axial strength. The container or bladder accumulator as a whole then becomes cheaper.

Another object of the present invention is to provide an improved bladder accumulator having the characteristics resulting from manufacture by the method of this invention.

Other objects, advantages and salient features of the present invention will become apparent from the following detailed description, which, taken in conjunction with the drawings, discloses a preferred embodiment of the present invention.

BRIEF DESCRIPTION OF THE DRAWINGS

Referring to the drawing that forms a part of this disclosure:

FIG. 1 is a side view in section of a bladder accumulator according to an exemplary embodiment of the invention.

DETAILED DESCRIPTION OF THE INVENTION

The bladder accumulator 10 shown in FIG. 1 comprises an accumulator housing 12 in which two media chambers 16, 18 are separated from each other by a bladder body 14. The first media chamber 16 of the bladder accumulator 10 is usually used to hold process gas, such as nitrogen gas. The second media chamber 18 accepts a liquid, such as hydraulic oil or similar liquid. The media chambers 16, 18 correspond to the usual gas side and liquid side, respectively, of the bladder accumulator 10.

The accumulator housing 12 is constructed in the manner of a composite pressure vessel, comprising an internal synthetic core container 20, which is wound on the outer circumference with a synthetic fibre, which forms a synthetic sheath 22. Instead of using said synthetic materials for the synthetic core container 20, as well as for the synthetic sheath 22, metallic materials can be used, such as aluminium for example, which is easy to mould and is well suited for drawing processes.

The synthetic core container 20 according to the depiction in the FIGURE, technically also called "liner", is preferably made from polyamide or polyethylene and is made through a blow moulding process or through rotational moulding. Such production methods are commonly known and therefore not explained in detail in this instance.

The invention provides that a gas filling valve 24 is attached to the sheath material of the bladder body 14 through vulcanising. The bladder body 14 is preferably made from an elastomeric, synthetic material, including natural rubber. The valve 24 not only serves for filling process gas, such as nitrogen gas, into the first media chamber 16 of the bladder body 14. The valve 24 can also be used to remove gas or, if required, to refill the bladder body again. Valve 24 is also used for gas pressure measurement via a common indicating device that is not shown. The bladder body 14 as well as the gas filling valve 24 are preferably placed together into the usual blow mould. Subsequently, a plastic tube is extruded (not shown) over the bladder body 14 with gas filling valve 24 through a corresponding plastic extruder nozzle. The extruded, soft plastic tube with integrated bladder body 14 with valve 24 is then formed through a not-depicted blow moulding tool. The moulding tool with its mould halves has an internal shape that produces the synthetic core container 20 according to the depiction in the FIGURE.

So as not to obstruct the extruding of the plastic tube over the bladder body 14 with valve 24, a vacuum may be applied inside the bladder body 14, preferably via gas filling valve 24, in order to slim down the bladder body 14 so that it does not make contact with the soft plastic material of the plastic tube during the extrusion and forming processes. For the purpose of further simplifying the production process, preferably a valve 26 for liquids, in particular in form of a poppet valve, is inserted into the blow mould tool opposite to the gas filling valve 24. The liquid valve 26 is then included by and connected to the plastic tube at its free lower end during the shaping process.

The bladder accumulator 10 shown in FIG. 1 FIGURE has a fluid-conducting connection to a not-depicted hydraulic line of a hydraulic circuit via the liquid supply valve or poppet valve 26. If the pressure at the liquid end is greater than the pressure at the process gas end in form of the media chamber 16, the poppet valve 28, under the additional effect of a compression spring 30 applied thereto, opens up and the second media chamber 18 fills with liquid. Depending on the pressure conditions inside the accumulator, the bladder body 14 with its compressible process gas is compressed, which simultaneously increases the gas pressure inside the first media chamber 16. If liquid is released from the second media chamber 18 of the bladder accumulator 10 through the open liquid valve 26, the elastomeric bladder body 14 is able to expand and potentially apply pressure with its underside on the disk 28 of the poppet valve 26, which then is brought into the closed position against the effect of the compression spring 30, as shown in FIG. 1. The valve disk 28, which is guided longitudinally moveable in a valve housing 32, is provided at its top with a convex surface to make the contact of the accumulator bladder 14 with the top of the disk 28 as gentle as possible.

The valve housing 32 is provided at its outer circumference with an annular groove for retaining a sealing ring 34, which on the outer circumference is in contact with a connection sleeve 36 that protrudes downwards and is part of the completed synthetic core container 20. The liquid valve or poppet valve 26 may be retained in position inside the connection sleeve 36 through a connecting nut 38, for example via a thread connection (not shown).

Since the synthetic core container 20 is rather thin-walled, for example having a wall thickness of 2 mm, an incompressible medium such as water or alcohol is introduced in a predeterminable quantity via the first and/or second media chamber 16, 18 so as to build up a counter-pressure from the inside of the accumulator housing 12 onto the synthetic core container 20, so that windings can be applied to it from the outside without the concern that the liner 20 may buckle or fold to the inside. As a result of the incompressible medium on the inside of the bladder accumulator 10, the thin-walled synthetic core container 20 is retained in position and reinforced in such a way that the windings may be applied without difficulty.

The liner or synthetic core container 20 is reinforced by fibre windings that are applied at the outside in the manner of a second synthetic sheath 22. The reinforcing windings include, for example, of fibre reinforcing in the form of rovings, such as carbon fibres, aramit fibres, glass fibres, boron fibres, $AL_2O_3$ fibres or a blend thereof, which are called hybrid yarns, and which are embedded in a base matrix of duromers (epoxy resins or phenolic resins) or in thermoplastics (PA6, PA12, PP). The fibre-reinforced composite material that forms the supporting shell contains fibre strands (rovings) that cross each other, that can extend in longitudinal and circumferential directions and are embedded in synthetic resin. However, the supporting shell 22 is formed preferably of crossing fibre strands (rovings) that are inclined in longitudinal and circumferential directions and, in an expedient further development, are inversely inclined along the longitudinal axis of the synthetic core container 20 in relation to each other. The longitudinal and circumferential forces, also seen in axial direction of the accumulator, can then be optimally retained by the pressure vessel as a whole.

FIG. 1 demonstrates to those skilled in the art of this field immediately that, in contrast to other solutions in the prior art (e.g., DE 10 2006 004 120 A1 and DE 10 2011 111 098 A1), the free cross-sectional openings or insertion openings 40, 42 for the gas filling valve 24 and the liquid valve 26, respectively, are very small with regard to their diameter, and may be in the vicinity of 50 mm or 60 mm respectively for a 10 litre bladder accumulator 10, for example. This has not been achieved in the prior art so far because, in technically comparable solutions, it was always necessary, with a finished accumulator housing 12, to pull the bladder body 14, or the accumulator bladder respectively, with its gas filling valve 24, attached through vulcanising, via the liquid connection and the inside of the accumulator in the direction of the gas end of the accumulator housing and to attach it there through the respective opening in the accumulator housing. Since, in the solution according to the invention, the synthetic core container 20 yet to be completed has already integrated the bladder body 14 with valve 24 in the forming step, it is no longer necessary to pull it through the inside of the housing at a later stage. Since, as already described, the gas filling valve 24 is already attached, preferably through vulcanising, to the top of the bladder body 14, when closing the moulding tool for the extruded plastic tube under formation of the synthetic core container or liner 20, a kind of annular pinch gap 44 forms at the top of the plastic tube material which, when the plastic tube as liner 20 has hardened, provides a secure attachment location for the gas filling valve 24 in the accumulator housing 12. In a similar manner, a corresponding annular-shaped pinch gap for the liquid valve 26 is formed through the cylindrical connection sleeve 36 of the plastic tube. Nevertheless, the valves 24 and/or 26 later can be attached to the finished liner 22 once the accumulator bladder 14 is located inside the accumulator and to affix the valve 24 to bladder body 24 through an adhesive, for example.

Since, as described, the opening cross-sections for the openings 40, 42 are very small, the winding angle in this section can be flat. Even in the section for the valve connection of the synthetic sheath 22, an even and thin layer structure is then achieved that does not tend to delaminate, but still has the required axial strength. Overall, a wall thickness for the synthetic sheath 22 of 10 mm for a bladder or accumulator size of 10 litres can be achieved. The accumulator solution according to the invention permits a direct application of the fibre layers onto the annular pinch gap 44 for the cylindrical connection sleeve 36 for the gas filling valve 24 and for the liquid valve 26, respectively, without any intermediary metallic collar components. Since metallic collar components can be completely omitted, the accumulator according to the invention is easily constructed, but still highly pressure-resistant.

While one embodiment has been chosen to illustrate the invention, it will be understood by those skilled in the art that various changes and modifications can be made therein without departing from the scope of the invention as defined in the claims.

The invention claimed is:

1. A method for manufacturing a bladder accumulator having first and second media chambers separated by a bladder body, the method comprising the steps of:
    extruding a plastic tube over an elastomeric bladder body after a vacuum pressure is applied to an interior of the bladder body;
    molding the plastic tube in a molding tool, with the interior of the interior bladder body evacuated in the plastic tube into a shaped of a predeterminable synthetic core container; and
    winding a synthetic fiber on an outside surface of the synthetic core container creating an accumulator housing with the bladder body therein.

2. A method according to claim 1 wherein
    the synthetic core container is stabilized from an inside thereof by introducing an incompressible medium into the inside of the synthetic core container in one of the first and second media chambers prior to the winding of the synthetic fiber on the outside surface of the synthetic core container.

3. A method according to claim 1 wherein
    a gas filling valve is attached to wall material of the bladder body by vulcanizing prior to the extruding of the plastic to be over the bladder body.

4. A method according to claim 3 wherein
    a valve for liquids is attached to the accumulator housing on a side thereof opposite the gas filling valve and is operable and brought into a closed position thereof by expansion of the bladder body when the accumulator housing is empty of liquid.

5. A method according to claim 4 wherein
    the valve for liquids is inserted into the synthetic core container prior to the winding of the synthetic fiber on the outside surface of the synthetic core container.

6. A method according to claim 5 wherein
    the valves for liquid is surrounded by a free end of the plastic tube when halves of the molding tube ae closed.

7. A method according to claim 4 wherein
    a diameter of the synthetic core container where the valve for liquids is located is similar in size to a diameter of the synthetic core container where the gas filling valve is located.

8. A method according to claim 1 wherein
    the synthetic core container has an essentially equal wall thickness throughout; and
    the synthetic fiber is wound on the outside surface of the synthetic core container to provide an essentially equal wall thickness throughout.

9. A method for manufacturing a bladder accumulator having gas and liquid media chambers supported by a bladder body, the method comprising the steps of:
    placing an elastomeric bladder body and a liquid valve in a blow molding tool with the bladder body having a gas filling valve fixed at one end thereof and with the gas filling valve and the liquid valve being spaced from one another in the blow molding tool;
    extruding a plastic tube into the blow molding tool and over the bladder body while the bladder body is deflated, the bladder body having the gas filling valve fixed thereon before the plastic tube is extruded over the bladder body;
    blow molding the plastic tube in the molding tool while the bladder body is deflated into a shape of a predetermined synthetic core container with opposite tubular ends of the synthetic core container directly engaging and extending about housings of the gas filling valve and the liquid valve; and
    winding a synthetic fiber on an outside surface of the synthetic core container creating an accumulator housing with the synthetic fiber directly engaging the tubular ends of the synthetic core container without ring members therebetween.

10. A method according to claim 9 wherein
    a vacuum pressure is applied to an interior of the bladder body before the plastic tube is extruded over the bladder body.

11. A method according to claim 9 wherein
    the synthetic core container is stabilized from an inside thereof by introducing an incompressible medium into the inside of the synthetic core container in a liquid media chamber thereof prior to the winding of the synthetic fiber on the outside surface of the synthetic core container.

12. A method according to claim 9 wherein
    a gas filling valve is attached to wall material of the bladder body by vulcanizing prior to the extruding of the plastic to be over the bladder body.

13. A method according to claim 9 wherein
    the liquid valve is operable and brought into a closed position thereof by expansion of the bladder body when the accumulator housing is empty of liquid.

14. A method according to claim 9 wherein
    the liquid valve is surrounded by the respective tubular end of the plastic tube when halves of the molding tube ae closed.

15. A method according to claim 9 wherein
    diameters of the tubular ends of the synthetic core container are similar in size.

16. A method according to claim 9 wherein
    the synthetic core container has an essentially equal wall thickness throughout; and
    the synthetic fiber is wound on the outside surface of the synthetic core container to provide an essentially equal wall thickness throughout.

* * * * *